UNITED STATES PATENT OFFICE.

CLYDE M. LONG, OF TOLEDO, OHIO, ASSIGNOR OF ONE-HALF TO JOHN M. LOSGAR, OF TOLEDO, OHIO.

PREPARED MORTAR.

1,162,790.     Specification of Letters Patent.     Patented Dec. 7, 1915.

No Drawing.     Application filed October 30, 1914. Serial No. 869,464.

*To all whom it may concern:*

Be it known that I, CLYDE M. LONG, a citizen of the United States, and a resident of Toledo, in the county of Lucas and State of Ohio, have invented a certain new and useful Prepared Mortar; and I do hereby declare the following to be a full, clear, and exact description of the invention, such as will enable others skilled in the art to which it appertains to make and use the same.

My invention relates to prepared mortar to be used in buildings, such as, in laying of brick, stone and making of stucco; and it has for its object to provide a mortar which is exceedingly smooth and very hard and durable when set and which may be made at an exceedingly low cost and one which requires a remarkably small proportionate amount of hydrated lime.

It also has for its object to provide a prepared mortar which may be kept in dry form and is at all times in condition for use, upon the mere application of water sufficient in amount to cause it to become plastic.

It also has for its object to produce an exceedingly smooth mortar which is very desirable to masons as it is easily handled and, moreover, conforms itself readily to roughened surfaces and makes a close binding contact with such surfaces.

In my invention I use sand containing particles of free iron, iron oxid and iron slag which is mixed with hydrated lime in proper proportions. This makes a mortar that is exceedingly hard when it has set and requires proportionately but a very small amount of hydrated lime. I find it preferable to form the mixture containing my invention, by mixing used molders' sand with the hydrated lime. The best mixture is made by using discarded molders' sand, which is blackened and charged with particles of iron and slag of iron and thoroughly burnt. This sand is rendered useless for molding purposes on account of being entirely burnt and filled with iron. Because of the continuous working to which such sand is subjected, it is exceedingly fine and that, taken with its composition and the powdered hydrated lime when mixed therewith makes the mortar exceedingly smooth and easily workable and desirable.

In forming the prepared mortar I use eight parts of the burnt charged sand to one of hydrated lime, to ten parts of burnt or charged sand to one of lime, which produces a mortar usable where mortar mixed at the time of using and formed of the sand now used by masons, hydrated lime and water, requires two parts of such sand to one of hydrated lime to three parts of sand to one of hydrated lime.

For mortar requiring little adhesive strength and commonly used for filling and usually made of ten parts of sand to one of hydrated lime, I use 16 parts of burnt or charged sand to one of hydrated lime to obtain substantially the same results.

The composition just described may be greatly varied in its proportionate parts and in the substitution of the ingredients which will perform the same functions or accomplish the same results in the mixture and such modifications of the composition may be used for many varied purposes and still contain the invention.

Having thus described my invention, what I claim as new, and desire to secure by Letters Patent, is,—

A mortar consisting of burnt molders' sand charged with particles of iron and slag and hydrated lime.

In testimony whereof, I have hereunto signed my name to this specification in the presence of two subscribing witnesses.

CLYDE M. LONG.

Witnesses:
   S. T. KLOTZ,
   F. E. AUL.

Copies of this patent may be obtained for five cents each, by addressing the "Commissioner of Patents, Washington, D. C."